April 1, 1952  McLEAN H. HARRIS ET AL  2,591,428
SELECTIVE COLOR DISPLAY PROJECTION APPARATUS
Filed Jan. 20, 1950  2 SHEETS—SHEET 1

INVENTORS
McLean H. Harris
Raymond E. McKee
BY
ATTORNEYS

April 1, 1952  McLEAN H. HARRIS ET AL  2,591,428
SELECTIVE COLOR DISPLAY PROJECTION APPARATUS
Filed Jan. 20, 1950  2 SHEETS—SHEET 2

INVENTORS
McLean H. Harris
Raymond E. McKee
BY
ATTORNEYS

Patented Apr. 1, 1952

2,591,428

UNITED STATES PATENT OFFICE 2,591,428

SELECTIVE COLOR DISPLAY PROJECTION APPARATUS

McLean H. Harris and Raymond E. McKee, Stockton, Calif.

Application January 20, 1950, Serial No. 139,764

1 Claim. (Cl. 88—24)

The present invention is directed to, and it is an object to provide, a novel display apparatus adapted for use by paint or furniture merchants, interior decorators, or the like to visually display to prospective customers the effect which will be attained with wall, floor, and room furnishings of certain colors; the colors of each being selectively variable to aid in the making, in advance, of a harmonious selection of said colors.

Another object of the invention is to provide color display apparatus, as above, which includes a viewing screen having thereon an initially uncolored representation of a room including walls, and furnishings; there being a novel color projector assembly adapted to project selective colors separately onto said walls and furnishings whereby many different color combinations may be shown to the customer.

A further object of the invention is to provide a color display apparatus, for the purpose described, which includes a novel selective color projection film corresponding to each of the main elements of the room ensemble illustrated on the screen, and the projector assembly being operative to project—from each film—a selected color onto solely the corresponding element of said ensemble. In this manner different color combinations may be presented to the customer for visual appraisal.

An additional object of the invention is to provide color display apparatus, for selective color projection onto separate elements of an ensemble represented on a screen, which is designed for ready use and convenience of manipulation.

A further object of the invention is to provide a practical and reliable color display apparatus, and one which will be exceedingly effective for the purpose for which it is designed.

These objects are accomplished by means of such structure and relative arrangement of parts as will fully appear by a perusal of the following specification and claim.

Referring now more particularly to the characters of reference on the drawings, the apparatus comprises an upstanding viewing screen 1 mounted some distance in front of a platform 2; said screen and platform being maintained in fixed relation by suitable means (not shown).

The platform 2 supports a plurality of film projectors 3 in spaced but side by side relation; such projectors 3 being set so that the fields of projection, as represented by the projection lines 4, match on the screen 1.

The film projectors 3 are of a type adapted to receive photographic film in roll form, and each projector includes a winding knob 5 whereby the frames of said films may be selectively positioned for projection.

Figure 1:
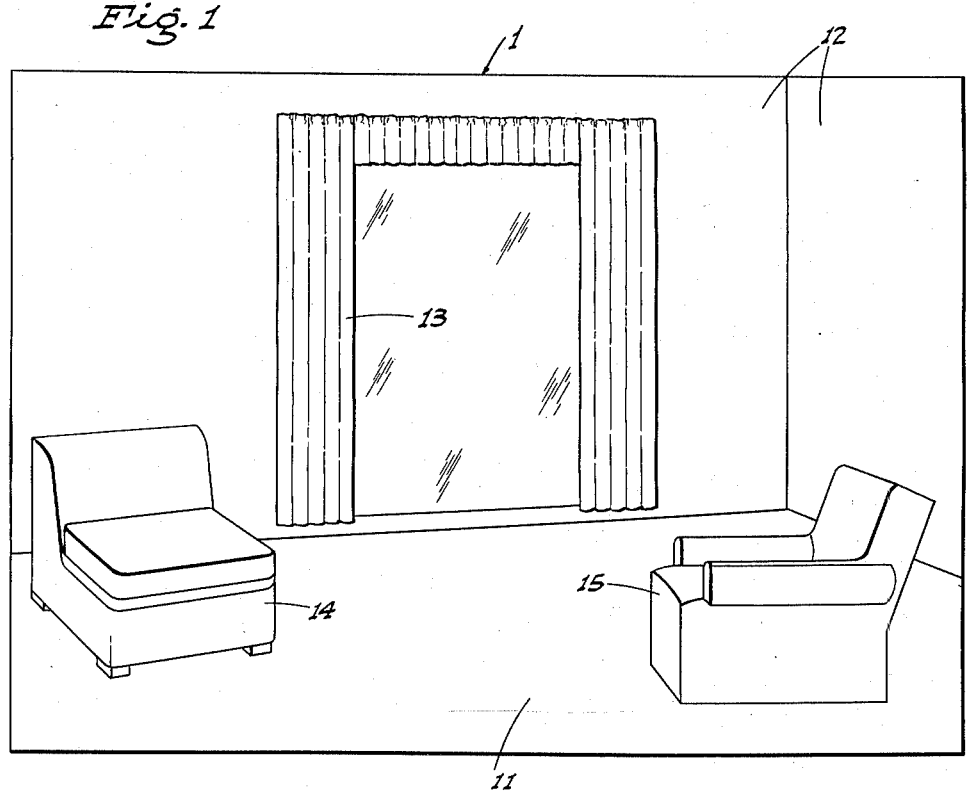
Fig. 1 is a front elevation of the screen with a perspective, initially uncolored representation of a room and furnishings thereon.
Figure 2:
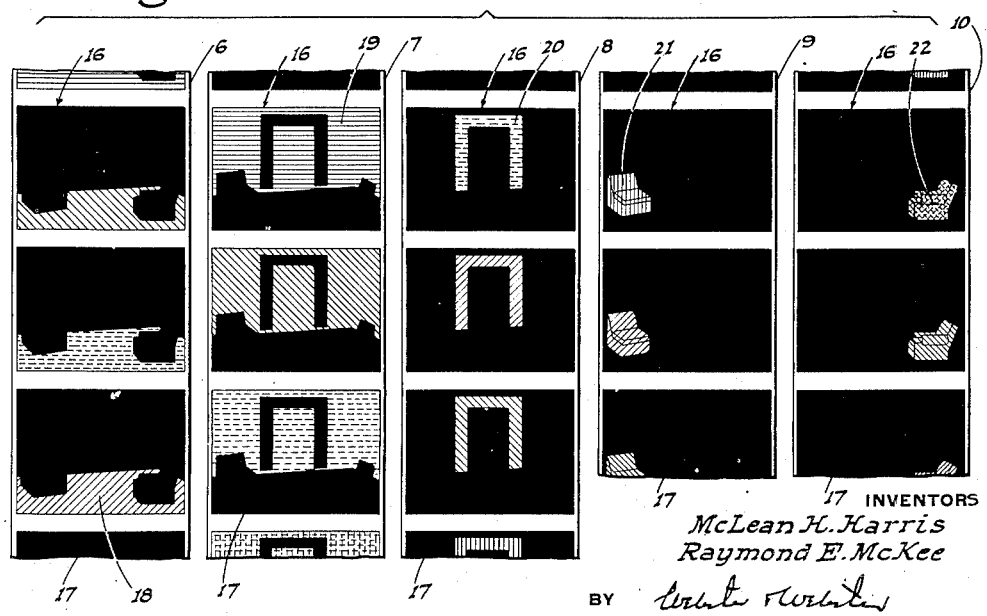
Fig. 2 is a fragmentary elevation of the plurality of films used in the apparatus.
Figure 3:
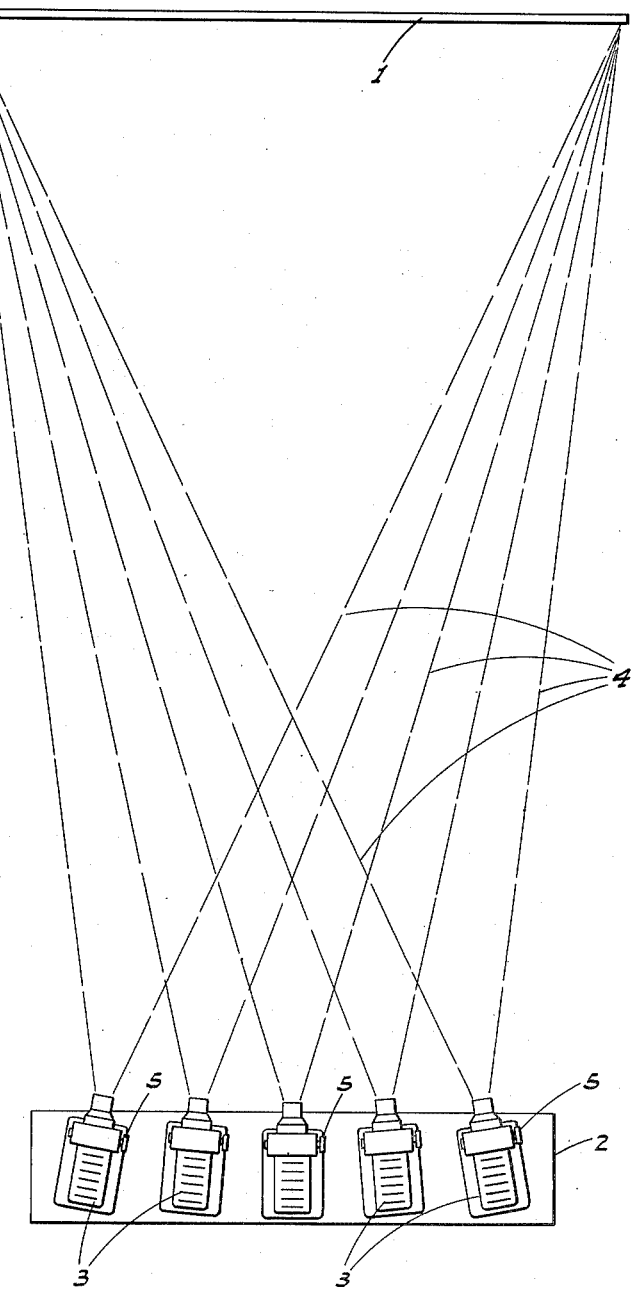
Fig. 3 is a plan view, diagrammatically, of the apparatus.

In the present embodiment there are five of the projectors 3; the films for said projectors, as shown in Fig. 2, being indicated at 6, 7, 8, 9, and 10.

On its face the upstanding viewing screen 1 is formed with a perspective representation of a room, including a floor 11, walls 12, window drapes 13, and separate chairs 14 and 15 respectively.

The films 6-10 inclusive are of special type, and each includes a plurality of longitudinally spaced frames 16; selected ones of said frames, when projected by the projectors 3, matching on the screen 1.

The films 6, 7, 8, 9, and 10 correspond, for projection, with the floor 11, walls 12, window drapes 13, chair 14, and chair 15 respectively; the individual frames 16 of each film being opaque, as at 17, except for a colored area representing in outline the element of the ensemble to which the related film corresponds. More specifically the colored area 18, 19, 20, 21, and 22 of each frame of said films 6-10 respectively, correspond in outline shape to, and when projected match, the representation on the screen 1 of said floor 11, wall 12, window drapes 13, chair 14, and chair 15; the individual colored areas of the frames 16 of each film being many different colors.

By the simple manipulation of the knobs 5 of the projectors 3, individual frames 16 of the several films may be brought into working position with a selected color projected by each, in matching relation, onto the corresponding element of the ensemble represented on the screen. Thus, it is possible to readily and conveniently change the color projected onto each element until a harmonius color scheme or combination is found.

For example, in connection with the sale of wall paint, the films 6, 8, 9, and 10 would be adjusted to project existing colors onto the representations on the screen of the floor 11, drapes 13, and chairs 14 and 15. Thereafter, the film 7 would be adjusted, frame by frame, until a harmonious color was projected onto the representation of the walls 12.

Thus the prospective customer is given a visual illustration of the ensemble as it will appear in actuality, yet with a wide range of individual color selection in advance.

While the color display system is here shown and described, by way of example, as used in connection with color selection for interior decoration, the invention is not limited to this particular adaptation, and has wide applicability.

From the foregoing description it will be readily seen that there has been produced such a color display system as will substantially fulfill the objects of the invention as set forth herein.

While this specification sets forth in detail the present and preferred construction of the color display system, still in practice such deviations therefrom may be resorted to as do not form a departure from the spirit of the invention, as defined by the appended claim.

Having thus described the invention, the following is claimed as new and useful, and upon which Letters Patent are desired:

Color display apparatus comprising a screen, the screen having thereon a plurality of initially uncolored representations of elements of an ensemble, a film corresponding to each represented element of the ensemble, each film including a plurality of frames and each frame having a colored area shaped for matching projection onto the related element of the ensemble, the colored areas of the frames of each film being of varied colors, and a projector for each film adapted to project any selected frame of such film onto the screen with its color area matching said related element; said frames being opaque except for said colored areas thereof.

McLEAN H. HARRIS.
RAYMOND E. McKEE.

REFERENCES CITED

The following references are of record in the file of this patent:

UNITED STATES PATENTS

| Number | Name | Date |
|---|---|---|
| 1,102,595 | Knight | July 7, 1914 |
| 1,260,221 | McCormick | Mar. 19, 1918 |
| 1,758,938 | Feldner | May 20, 1930 |
| 1,806,452 | Fulgora | May 19, 1931 |
| 1,821,626 | Fleischer | Sept. 1, 1931 |
| 1,869,275 | Planer | July 26, 1932 |
| 1,912,582 | Kelley | June 6, 1933 |
| 2,059,361 | Kenworth | Nov. 3, 1936 |
| 2,147,648 | Greathouse | Feb. 21, 1939 |
| 2,196,587 | Herrold | Apr. 9, 1940 |
| 2,301,274 | Greiser | Nov. 10, 1942 |
| 2,488,955 | Wood | Nov. 22, 1949 |